US009054902B2

United States Patent
Song et al.

(10) Patent No.: US 9,054,902 B2
(45) Date of Patent: Jun. 9, 2015

(54) APPARATUS AND SYSTEM FOR SWITCHING EQUALIZATION

(75) Inventors: Sanquan Song, Belmont, MA (US); Jian J. X. Xu, Westborough, MA (US); Larry R. Tate, Hopkinton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,124

(22) PCT Filed: Mar. 16, 2012

(86) PCT No.: PCT/US2012/029454

§ 371 (c)(1), (2), (4) Date: Jun. 17, 2013

(87) PCT Pub. No.: WO2013/137911

PCT Pub. Date: Sep. 19, 2013

(65) Prior Publication Data

US 2014/0204990 A1 Jul. 24, 2014

(51) Int. Cl.

| | |
|---|---|
| ***H04L 27/01*** | (2006.01) |
| ***H04B 1/10*** | (2006.01) |
| ***H04B 1/12*** | (2006.01) |
| ***H04L 25/03*** | (2006.01) |
| ***H04L 25/02*** | (2006.01) |

(52) U.S. Cl.

CPC *H04L 27/01* (2013.01); *H04B 1/10* (2013.01); *H04B 1/12* (2013.01); *H04L 25/03* (2013.01); *H04L 25/0272* (2013.01); *H04L 25/03006* (2013.01)

(58) Field of Classification Search

USPC ......... 375/316, 229, 230, 231, 232, 233, 346, 375/348

See application file for complete search history.

(56) References Cited

U.S. PATENT DOCUMENTS

| | | | | |
|---|---|---|---|---|
| 4,636,654 | A | 1/1987 | Lach | |
| 7,668,238 | B1 * | 2/2010 | Rokhsaz | 375/233 |
| 8,325,792 | B2 * | 12/2012 | Sunaga et al. | 375/233 |
| 8,698,532 | B2 * | 4/2014 | Raghavan | 327/208 |
| 2003/0043900 | A1 | 3/2003 | Deas et al. | |
| 2005/0201455 | A1 * | 9/2005 | Wilson | 375/232 |
| 2006/0164404 | A1 | 7/2006 | Maone et al. | |
| 2008/0018370 | A1 | 1/2008 | Lee | |
| 2008/0267156 | A1 * | 10/2008 | Gubeskys et al. | 370/342 |
| 2009/0034601 | A1 * | 2/2009 | Shakiba et al. | 375/232 |
| 2009/0279893 | A1 * | 11/2009 | Tran et al. | 398/79 |
| 2010/0080178 | A1 * | 4/2010 | Cox et al. | 370/329 |
| 2013/0241622 | A1 * | 9/2013 | Zerbe et al. | 327/323 |

OTHER PUBLICATIONS

International Search Report and Written Opinion issued for International Patent Application No. PCT/US2012/029454, mailed Nov. 28, 2012, 9 pages.

International Preliminary Report on Patentability issued for International Patent Application No. PCT/US2012/029454, mailed Sep. 25, 2014, 6 pages.

* cited by examiner

*Primary Examiner* — Siu Lee

(74) *Attorney, Agent, or Firm* — Blakely, Sokoloff, Taylor & Zafman LLP

(57) ABSTRACT

Described herein is apparatus and system for switching equalization. The apparatus comprises a sampler to sample an input signal; and an attenuator, coupled to the sampler, with a hysteresis associated with the input signal, the hysteresis of the attenuator is configurable to cancel hysteresis of a communication channel coupled to the attenuator.

16 Claims, 7 Drawing Sheets

200 even cycle 209 208 OUT 203 207 IN $r_{o-}$ $r_{o+}$ $V_{o-}$ $V_{o+}$ $r_{fb}$ $V_{g+,ev}$ $V_{g-,ev}$ M1 M2 204 205 $V_{g+,od}$ M3 M4 $V_{g-,od}$ 106 $V_{CH+}$ $V_{CH-}$ $r_{in}$ $C_{in+}$ $C_{in-}$ $I_{tail}$ 206 104

Sampler 201

Attenuator 202

APPARATUS AND SYSTEM FOR SWITCHING EQUALIZATION

CLAIM OF PRIORITY

This application claims the benefit of priority of International Patent Application No. PCT/US2012/029454 filed Mar. 16, 2012, titled "APPARATUS AND SYSTEM FOR SWITCHING EQUALIZATION," which is incorporated by reference in its entirety.

BACKGROUND

Inter-symbol interference (ISI) is a major source of noise when communicating between a transmitter (TX) and a receiver (RX) of a communication system. ISI is a form of signal distortion in which one symbol in the signal interferes with subsequent symbols in the signal. Consequently, the previous symbols have similar effect as noise. This noise in the signal being received by an RX makes the communication less reliable. ISI is usually caused by the low pass nature of a channel causing successive symbols to "blur" together. The presence of ISI in the communication system introduces errors in a decision device in the RX.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
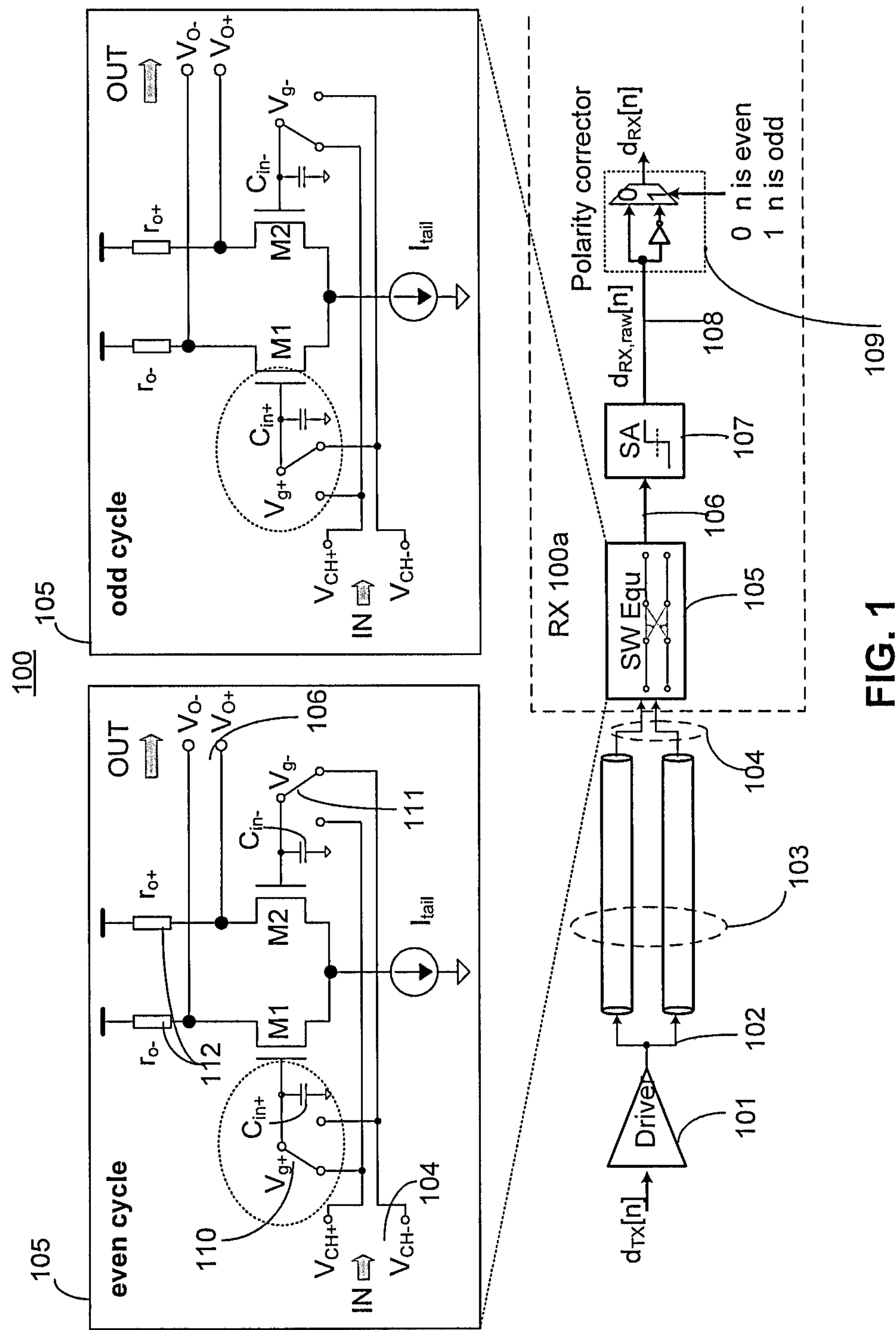
FIG. 1 is a differential high speed input-output (I/O) transceiver with a receiver (RX) having a switching equalizer which is operable to provide switching equalization, according to one embodiment of the disclosure.

Variant approaches, such as TX pre-emphasis, RX linear equalization (LE), and decision feedback equalization (DFE) are used to reduce ISI. However, these approaches increase power dissipation and silicon area, and also introduce additional timing critical paths.

For example, TX pre-emphasis may not cancel most of ISIs thus unable to reopen the eye diagram for highly attenuated channels. RX LE is implemented by inserting additional high frequency poles in the signal path to attenuate the low frequency portion of the received signal and to boost the high frequency portion to cause the overall RX system to generate a flat frequency response. The additional high frequency poles inserted in the signal path exacerbate power dissipation and increase circuit area. For DFE, the data recovered by the RX is used to either tune the threshold of a sense amplifier (SA) to erase the ISI portion from the received signal directly. However, the first tap cancellation path in the DFE circuit is a timing critical path. Moreover, TX pre-emphasis, RX LE, and DFE require high bandwidth on the signal path to avoid additional circuit caused hysteresis resulting in higher power consumption.

Embodiments of the disclosure relate to an apparatus and system for switching equalization to reduce noise, for example, ISI. In one embodiment, the apparatus applies per-bit switching of the input connections and utilizes parasitic or discrete resistance and capacitance to convert low frequency poles to high frequency poles which compensate the ISI introduced by the bandwidth limited communication channel.

The technical effects of the embodiments discussed herein are many. For example, the apparatus herein improves eye width of the signals at the output of a receiver (RX) for correctly sampling the signals at the output of the RX. The embodiments of the apparatus herein also save the efforts of avoiding the parasitic capacitance at the RX front-end by using the parasitic capacitance and/or discretely added capacitance to achieve the best ISI cancellation effect. The embodiments herein are compatible with existing equalization schemes, such as linear equalization (LE) and decision feedback equalization (DFE). This means that the existing equalization schemes, such as LE and DFE, can be added to the apparatus herein to cancel more ISI. The embodiments discussed herein provide a bandwidth converting system of converting a low bandwidth system to a high bandwidth system, which can be applied to a much broader range of applications. The above technical effects are not limiting in any way. Other technical effects are contemplated by the embodiments discussed herein.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal.

The meaning of "a", "an", and "the" include plural references. The meaning of "in" includes "in" and "on".

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments described herein, the transistors are metal oxide semiconductor (MOS) transistors, which include drain, source, gate, and bulk terminals. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The terms "MN" herein indicates an n-type transistor (e.g., NMOS, NPN BJT, etc) and the term "MP" indicates a p-type transistor (e.g., PMOS, PNP BJT, etc).

FIG. 1 is a differential high speed input-output (I/O) transceiver 100 with a RX 100*a* which is operable to provide switching equalization, according to one embodiment of the disclosure. In one embodiment, the RX 100*a* receives a differential signal 104 driven by a transmitter 101 over a communication channel 103. So as not to obscure the embodiments of the disclosure, certain RX 100*a* components (e.g. electro-static discharge circuits, etc) are not shown. The differential input signal 104 is received by a switching equalizer 105 that cancels or reduces ISI caused by hysteresis in the communication channel 103.

In one embodiment, the communication channel 103 is formed of metal (e.g., copper, silver, gold, aluminum, etc). In other embodiments, the communication channel 103 is an optical fiber. In such embodiments, the RX 100*a* includes an optical to electrical converter prior to the switching equalizer 105.

In one embodiment, the output 106 of the switching equalizer 105 is received by a sense amplifier (SA) 107 to determine the bit value of the received signal 104. The SA 107 may be a single stage or multi-stage amplifier. In one embodiment, the SA 107 includes offset cancellation mechanism (not shown) to cancel or compensate for input offset of the SA 107.

In one embodiment, the output 108 of the SA 107 is received by a serializer (not shown) to convert the differential output 108 to a serial signal which is then input to a polarity corrector 109. In one embodiment, the polarity corrector 109 selects a portion of the serial signal 108. In one embodiment, the polarity corrector 109 comprises a multiplexer controllable by a periodic signal to select odd and even signal bits from the signal 108. The output of the polarity corrector 109 is then used for further processing of the received signal.

In one embodiment, the switching equalizer 105 comprises a differential pair amplifier with a current source $I_{tail}$ coupled to n-type input devices M1 and M2 that steer current, wherein the n-type input devices M1 and M2 are coupled to switches 110 and 111 respectively. In the embodiments discussed herein the differential pair transistors (e.g., M1 and M2) are NMOS transistors. In other embodiments, other n-type transistors (e.g., NPN BJT transistors, etc) can be used without changing the essence of the embodiments of the disclosure.

In one embodiment, the switches 110 and 111 electrically couple the differential input 104 to the gates of the n-type input devices M1 and M2. In one embodiment, the switches 110 and 111 are implemented as pass-gates or transmission gates, wherein the gate terminal of the pass-gates or transmission gates are controlled by a periodic signal generated by another logic unit (not shown).

In one embodiment, the periodic signal is a clock signal indicating even and odd cycles of the input signal 104. In such an embodiment, the switch 110 couples the node carrying $V_{CH+}$ signal (one of the differential pair signal 104) to the gate of the n-type device M1 while the switch 111 couples the node carrying $V_{CH-}$ signal (the other one of the differential pair signal 104) to the gate of the n-type device M2. This embodiment is referred herein as the "even cycle." In one embodiment, the switch 110 couples the node carrying $V_{CH-}$ signal to the gate of the n-type device M1 while the switch 111 couples the node carrying $V_{CH+}$ signal to the gate of the n-type device M2. This embodiment is referred herein as the "odd cycle."

In one embodiment, termination resistors $r_{0-}$ and $r_{0+}$, collectively labeled as 112, are coupled between source/drain terminals of the n-type transistors M1 and M2 and a power supply node. In one embodiment, the value of the termination impedance of termination resistors 112 is substantially close to the impedance of the communication channel 103. The term "substantially close" herein refers to being within 20% of the ideal value. In other embodiments, the termination impedance of termination resistors 112 is not close to the impedance of the communication channel 103.

In the embodiments discussed herein, the RX switching equalizer 105 switches the RX connections (nodes 104) to the positive/negative channels per bit. During the even cycle, the positive RX input pin/node ($V_{CH+}$) is coupled to the positive channel (gate of n-type device M1) by the switch 110 and the negative pin/node ($V_{CH-}$) is coupled to the negative channel (gate of n-type device M2) by the switch 111.

Assuming 'n' as the cycle number for the signal 104, and further assuming zero-state at the end of cycle 2n−1, then at the end of even cycle 2n, the channel differential input $V_{ch,\ diff}[2n]$ 104 is sampled and amplified, based on which SA 107 provides the recovered data $d_{RX,raw}[2n]$ 108. In one embodiment, the voltage $V_{ch,\ diff}[2n]$ is kept in the gate/wire parasitic capacitors ($C_{in+}$ and $C_{in-}$) and attenuates in the follow-on cycles with related RC (resistor-capacitor) circuits. In one embodiment, the residue level is $\alpha V_{ch,\ diff}[2n]$ at the end of odd cycle 2n+1, where 'α' depends the RC attenuation rate.

In one embodiment, during the odd cycle 2n+1, the positive pin/node 104 carrying the signal $V_{CH+}$ is coupled to the negative channel (gate of n-type device M1) by the switch 110 while the negative pin/node 104 carrying the signal $V_{CH-}$ is coupled to the positive channel (gate of n-type device M2) by the switch 111. In such an embodiment, the sampled channel differential voltage for cycle 2n+1 is $-V_{ch,diff}[2n+1]$, where the negative sign is due to the connection swap. Because of superposition, the voltage detected by the RX 101*a* is $-V_{ch,\ diff}[2n+1]+\alpha V_{ch,\ diff}[2n]$, based on which the SA 107 recovers data $d_{RX,raw}[2n+1]$.

By iteration, the actual sampled voltage at the end of 2n+1 cycle is:

$$-V_{ch,diff}[2n+1]+\alpha V_{ch,diff}[2n]-\alpha^2 V_{ch,diff}[2n-1]+\alpha^3 V_{ch,diff}[2n-2]- \dots,$$

showing multiple post cursors cancellation.

The sampled values sampled by the switching equalizer 105 are:

$$\text{Even: } V_{in}[2n]-\alpha V_{in}[2n-1]+\alpha^2 V_{in}[2n-2]-\alpha^3 V_{in}[2n-3] \dots.$$

$$\text{Odd: } -V_{in}[2n+1]+\alpha V_{in}[2n]-\alpha^2 V_{in}[2n-1]+\alpha^2 V_{in}[2n-2] \dots.$$

where $V_{in}$ is the same as $V_{ch,\ diff}$.

Because of input connection switching, the polarity of every other bit in $V_{in}$ is inverted. In one embodiment, the follow-on multiplexer 109 (polarity corrector) is added to correct the polarity as shown in the FIG. 1.

In one embodiment, the response of a switching equalizer 105 to a pulse δ[n] sampled by the SA 107 is:

$$h[n]=\delta[n]-\alpha\delta[n-1]+\alpha^2\delta[n-2]-\alpha^3\delta[n-3]+\alpha^4\delta[n-4]\ \ldots$$

The corresponding z-transform is:

$$H(z)=\sum_{n=0}^{+\infty}h[n]z^{-n}=\sum_{n=0}^{+\infty}(-\alpha)^n z^{-n}=\frac{1}{1+\alpha z^{-1}}$$

In such an embodiment, by switching the input connections ($V_{CH+}$ and $V_{CH-}$), a low-pass-by-nature filter is converted into a high-pass filter in discrete domain, which results in equalization that cancels or reduces ISI.

For example, in one embodiment the switching equalizer 105 cancels channel pulse response of g[n]=δ[n]+αδ[n−1] completely. In other words, without introducing feedback loops as in DFE, which in general are timing critical paths, the switching equalizer 105 achieves first post cursor cancelation.

In one embodiment, the switching equalizer 105 can handle more general channels. So as not to obscure the embodiments of the disclosure, when the channel pulse response is assumed to be:

$$g[n]=\delta[n]+\alpha\delta[n-1]+\alpha^2\delta[n-2]+\ldots,$$

the pulse response after the switching equalizer 105 is:

$$g[n]*h[n]=\delta[n]+\alpha^2\delta[n-2]+\alpha^4\delta[n-4]+\ldots.$$

In this embodiment, the switching equalizer 105 cancels the first post cursor tap and every other taps. In one embodiment, the residue ISI is further reduced by DFE. While the embodiment of FIG. 1 describes a differential RX, the same concept of switching equalizer 105 is applicable for single-ended RX as described with reference to FIG. 4.

Figure 2:
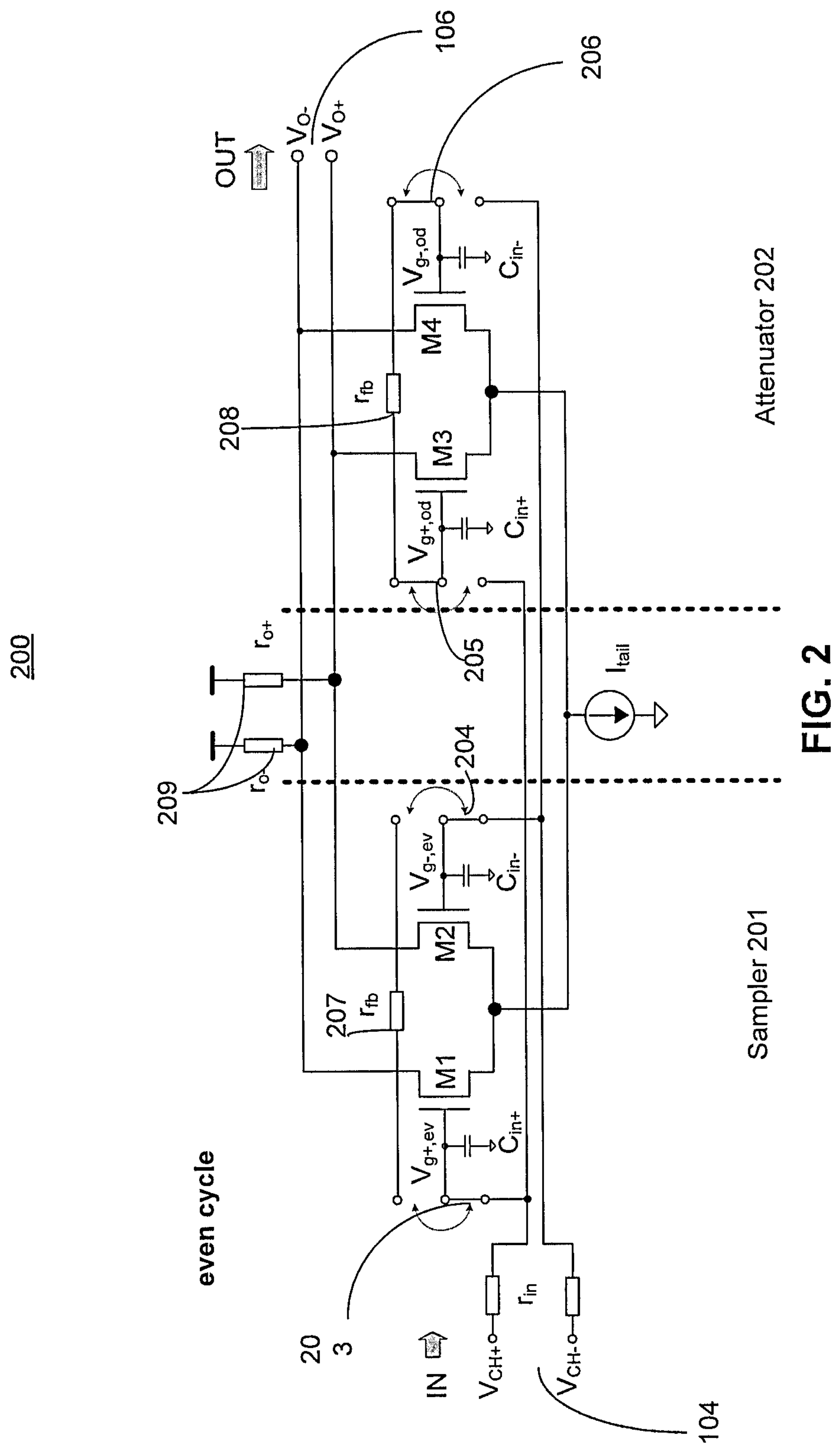
FIG. 2 is a two-way interleaved switching equalizer, according to one embodiment of the disclosure.

FIG. 2 is a two-way interleaved switching equalizer 200, according to one embodiment of the disclosure. In one embodiment, the switching equalizer 200 resolves the issue related to attenuation factor for residue voltage 'α' being associated with the channel voltage sampling speed. To achieve higher sampling accuracy, higher input bandwidth (smaller 'α') is needed. On the other hand, to achieve the best/optimum equalization performance, 'α' should match the channel i.e., input bandwidth is close to channel bandwidth.

Hence a trade-off between sampling accuracy and equalization performance exists and requires careful tuning. To break this correlation, in this embodiment, the two-way interleaved switching equalizer 200 comprises at least two differential pairs (201 and 202), wherein the first differential pair 201 operates in sampling mode while the second differential pair 202 operates in the residue attenuation mode—the first differential pair 201 forms the first way while the second differential pair 202 forms the second way of the two-way interleaved switching equalizer 200. As discussed herein, the first and second differential pairs switch roles of being a sampler and an attenuator for every even or odd cycle in $V_{in}$ 104.

In this embodiment, the first differential pair 201 comprises input n-type transistors M1 and M2 with respective gate terminals that are selectively coupled to an attenuation resistor 207 in attenuation mode via switches 203 and 204 respectively. In this embodiment, the respective gate terminals of the input n-type transistors M1 and M2 are selectively coupled to the input nodes carrying the signals $V_{CH+}$ and $V_{CH-}$ (collectively 104) in sampling mode via switches 203 and 204 respectively. As mentioned with reference to FIG. 1, the switches 203 and 204 are implemented as pass-gates or transmission gates (TGs) and are operable to turn on or off by a periodic signal indicating even and/or odd signal bit (or cycle) in the signal 104.

Referring back to FIG. 2, in this embodiment the second differential pair 202 comprises n-type input transistors M3 and M4 with respective gate terminals that are selectively coupled to an attenuation resistor 208 in attenuation mode via switches 205 and 206 respectively. In this embodiment, the respective gate terminals of the n-type input transistors M3 and M4 are selectively coupled to the input nodes carrying the signals $V_{CH+}$ and $V_{CH-}$ (collectively 104) in sampling mode via switches 205 and 206 respectively. In one embodiment, the input capacitors $C_{in}$ at the gates of the n-type transistors M1-M4 attenuate the sampled signal in attenuation mode, where the attenuation rate has a time constant of $C_{in}\times r_{atten}$. In the embodiments where $C_{in}$ is parasitic and/or discrete capacitance, the attenuation rate is controlled by $r_{atten}$ 208/207. In one embodiment, the resistors $r_{atten}$ 208/207 have programmable and/or adaptive resistance.

For example, the resistors $r_{atten}$ 208/207 may have the capability of adding or subtracting resistances to change the effective resistance of $r_{atten}$ 208/207. In one embodiment, the resistance $r_{atten}$ may be changed using bias voltages, wherein the resistors $r_{atten}$ 208/207 are formed as pass-gate transistors with their gates coupled to the bias voltages. In one embodiment, $r_{atten}$ 208/207 is a single resistor (or group of resistors) shared by the two differential pairs 201 and 202. In such an embodiment, the overall area (i.e., size) of the switch equalizer 200 is reduced compared to using two sets of $r_{atten}$ 208/207.

While the embodiment of FIG. 2 is illustrated such that the first differential pair 201 is in sampling mode while the second differential pair 202 is in attenuation mode, the differential pairs 201 and 202 switch roles every cycle of the input 104.

In one embodiment, when the second differential pair 202 is switched via switches 205 and 206 to operate in attenuation mode, the second differential pair 202 attenuates a previous value sampled by the second differential pair 202. In such an embodiment, the second differential pair 202 previously operated in sampling mode via switches 205 and 206 prior to operating in attenuation mode. By attenuating the previous bit value (which was previously sampled), hysteresis of the channel 103 is mimicked which results in subtracting hysteresis from the previous sampled bit thus canceling or reducing ISI.

In one embodiment, when the first or second differential pair (201 or 202) is in sampling mode, the differential pair exhibits a bandwidth of $R_{term}\times C_{parasitic+/-}$, where $R_{term}$ is the termination impedance $r_{o-}$ and $r_{o+}$. In this embodiment, when the first or second differential pairs (201 or 202) is in attenuation mode, the differential pair (201 or 202) exhibits a bandwidth of $r_{atten}\times C_{in+/-}$.

In one embodiment, $C_{in}$ is 6 fF, $r_{atten}$ is 20 KOhms, $C_o$ is 10 fF, $r_{in}$ is 1 KOhms, $r_{o+}$=1.5 KOhms, and $r_{o-}$=1.5 KOhms. In other embodiments, other values for $C_{in}$, $r_{atten}$, $C_o$, $r_{in}$, $r_{o+}$, $r_{o-}$ may be used. It should be appreciated that example sizes/models/values/ranges are given, although the embodiments are not limited to the same. As manufacturing techniques (e.g., photolithography) mature over time, it is expected that devices of smaller size could be manufactured.

Figure 3A:
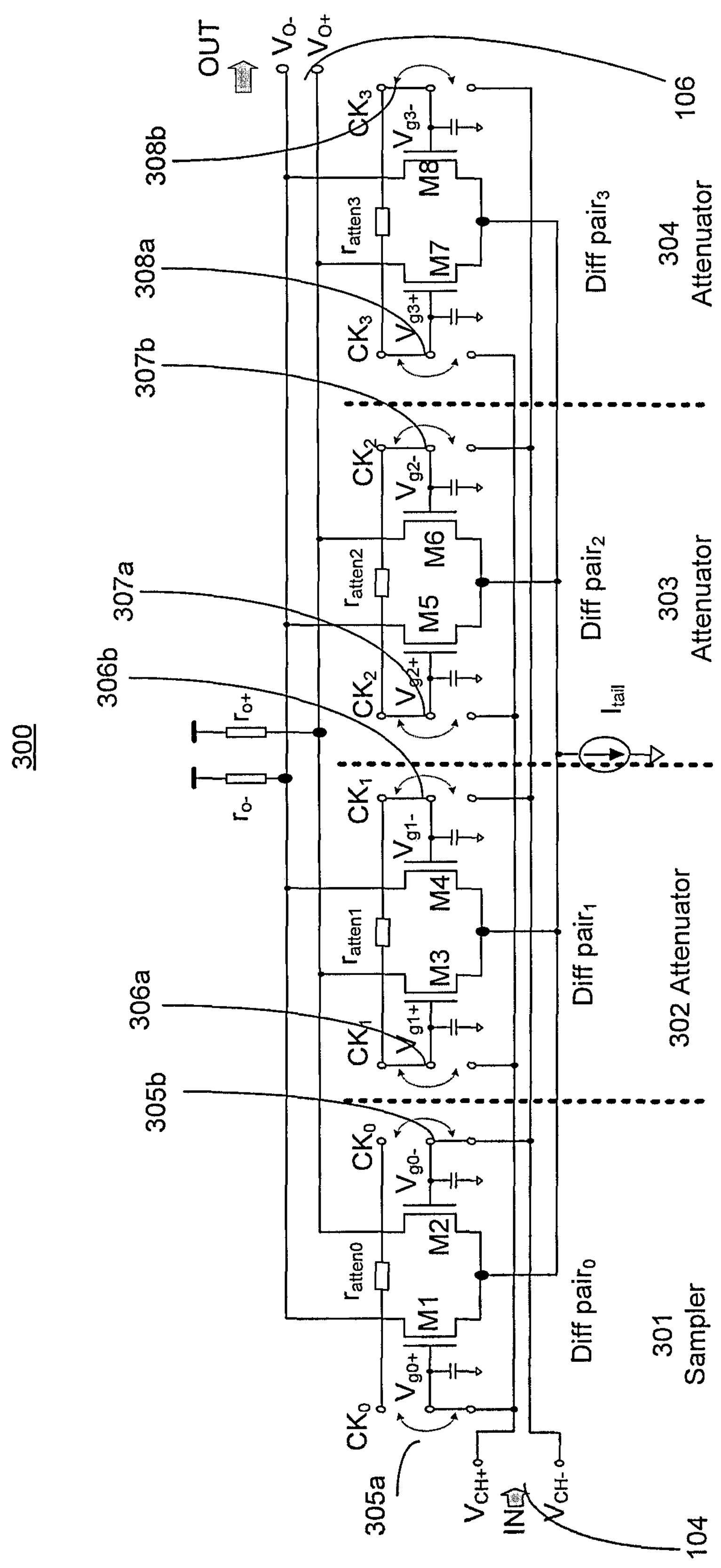
FIG. 3A is a four-tap implementation of a switching equalizer, according to one embodiment of the disclosure.

FIG. 3A is a four-tap implementation of a switching equalizer 400, according to one embodiment of the disclosure. So as not to obscure the embodiments of the disclosure, only the differences between the switching equalizer 200 and the switching equalizer 400 are discussed herein. In one embodiment, the switching equalizer 400 provides multiple order of cancellation of ISI. In one embodiment, the switching equalizer 400 comprises four differential pairs—301, 302, 303, and 304. In this embodiment, one of the differential pairs operates in sampling mode, while the other differential pairs operate in attenuation mode. In other embodiments, a 6-tap (or more tap) switching equalizer may be implemented using the concepts discussed herein.

The embodiment of FIG. 3A illustrates the operation of the switching equalizer 400 when the first differential pair 301 operates in sampling mode to sample the input signal 104 by causing the switches 305*a* and 305*b* to couple the nodes carrying the input signal 104 to the gates of the n-type transistors M1 and M2. In this embodiment, the second differential pair 302 operates in attenuation mode by causing the switches 306*a* and 306*b* to couple the gates of the transistors M3 and M4 with the attenuation resistor $r_{atten1}$. In this embodiment, the third differential pair 303 operates in attenuation mode by causing the switches 307*a* and 307*b* to couple the gates of the n-type transistors M5 and M6 with the attenuation resistor $r_{atten2}$. The fourth differential pair 304, in this embodiment, operates in attenuation mode by causing the switches 308*a* and 308*b* to couple the gates of the n-type transistors M7 and M8 with the attenuation resistor $r_{atten2}$. While the logic unit controlling the switches is not shown, in one embodiment the logic unit comprises buffers that drive clock signals to the gates of the switches as discussed with reference to FIG. 3B.

Figure 3B:
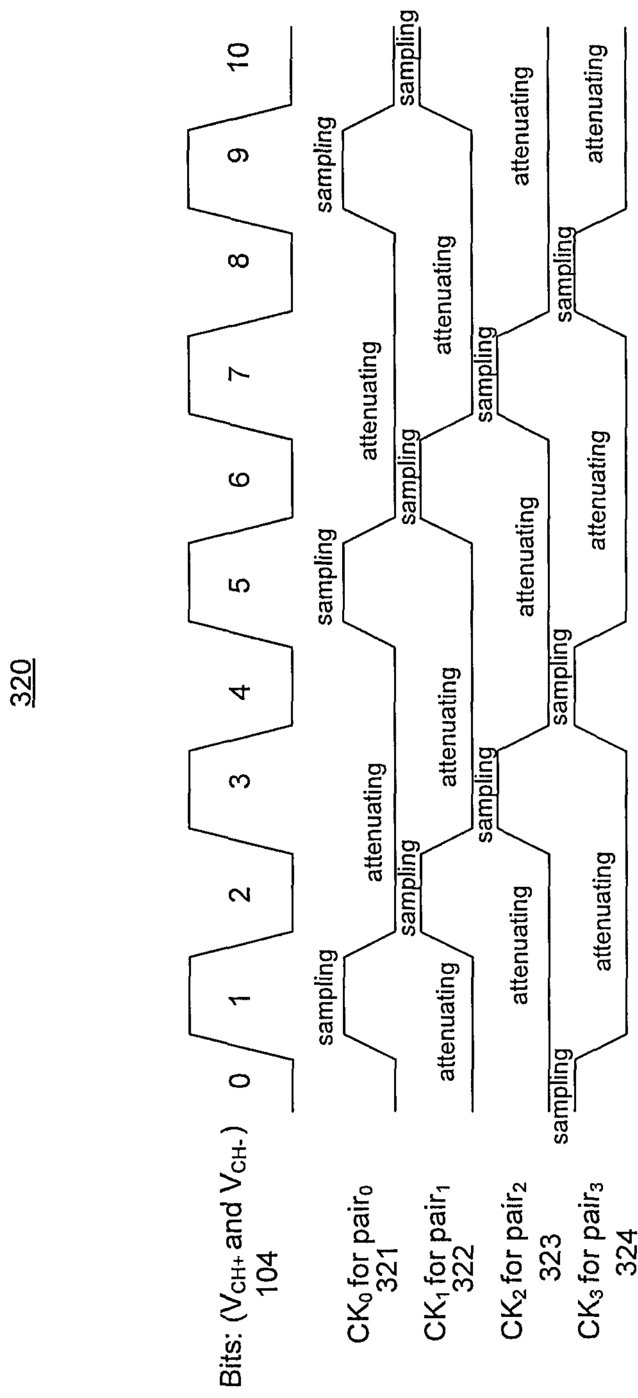
FIG. 3B is a timing diagram of the clock signals used by the four-tap implementation of the switching equalizer, according to one embodiment of the disclosure.

FIG. 3B is a timing diagram 320 of the clock signals used by the four-tap implementation of the switching equalizer 400, according to one embodiment of the disclosure. The top waveform is an exemplary input signal 104 (in single ended form) with each phase numbered. The periodic signals 321, 322, 323, and 324 are the clock signals used for controlling the switches 305*a*/305*b*, 306*a*/306*b*, 307*a*/307*b*, and 308*a*/308*b* respectively so that one of the differential pairs is in sampling mode while the others are in attenuating mode. In one embodiment, at every clock cycle, the role of sampling mode changes from one differential pair to another.

Figure 4:
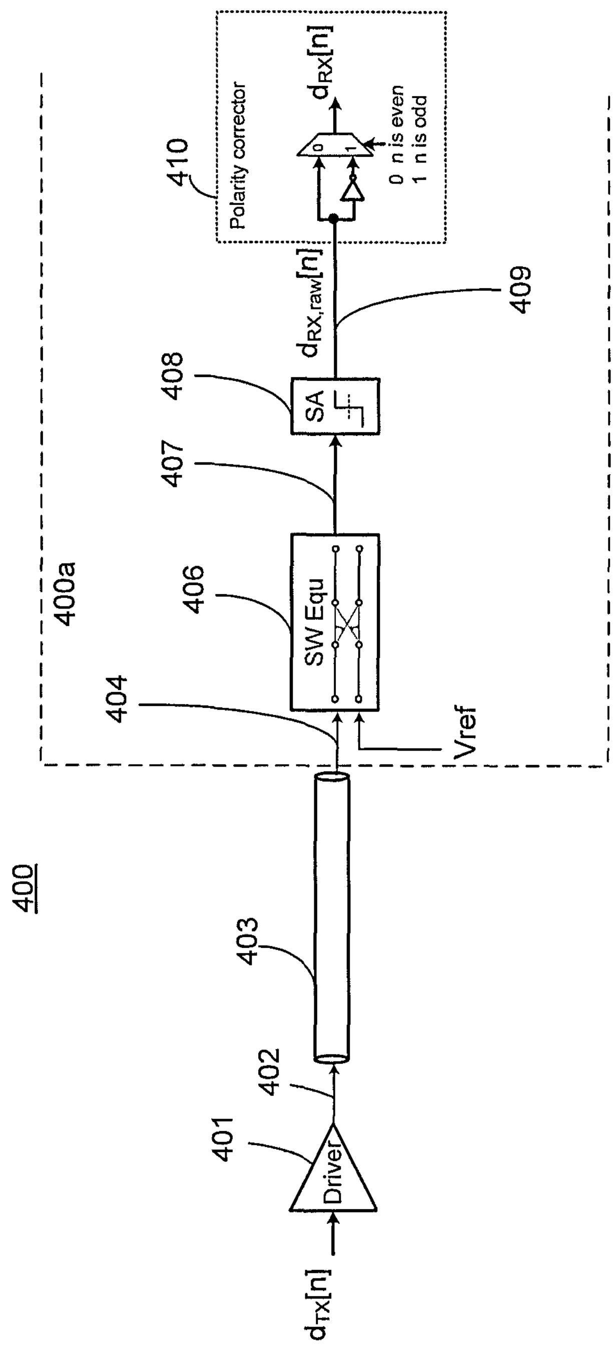
FIG. 4 is a single-ended RX which is operable to provide switching equalization, according to one embodiment of the disclosure.

FIG. 4 is a single-ended transceiver 400 which is operable to provide switching equalization, according to one embodiment of the disclosure. The embodiment of FIG. 4 operates the same way as other embodiments discussed herein for the switching equalization but for cancelling ISI in a single ended signal received by the receiver 400*a*. In one embodiment, a single-ended transmitter (TX) 401 transmits a single-ended signal 402 over a single-ended transmission media 403 (e.g., metal wire or optical fiber) to the receiver 400*a*. In one embodiment, the RX 400*a* comprises the same components as discussed with reference to FIGS. 1-3. In this embodiment, the differential pairs in the switching equalizer 406 are operable, via their switches, to couple the received signal 404 and a reference signal 405 to the gates of the n-type transistors of the switching equalizer 406. In one embodiment, the reference signal 405 is a voltage reference generated by any reference generation means, for example, resistor ladder, bandgap reference generator etc.

The output 407 of the switching equalizer 406 is then received by a SA 408 to determine the bit value of the received signal 404. In one embodiment, the output of the sense amplifier 408 is serialized by a serializer (not shown). In one embodiment, a polarity corrector 410 comprising of a multiplexer corrects the polarity of the output signal 409. The output of the polarity corrector 410 is then received by other logic (not shown) for further processing of the signal.

Figure 5:
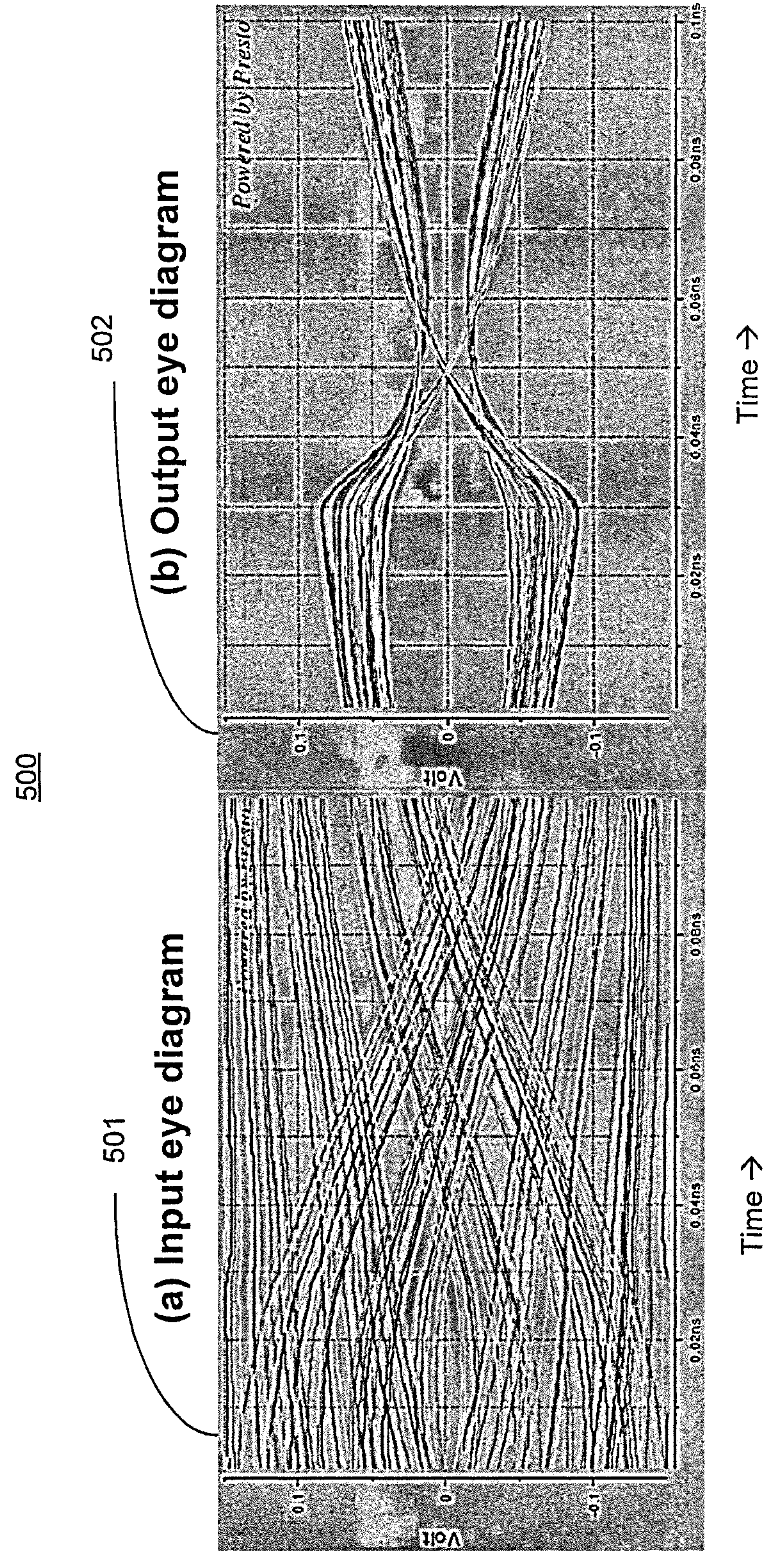
FIG. 5 are plots illustrating the technical effect of the RX which is operable to provide switching equalization, according to one embodiment of the disclosure.

FIG. 5 are plots 500 illustrating the technical effect of the switching equalizer, according to one embodiment of the disclosure. The plot 501 on the left is an eye diagram of the signal received by the switching equalizers (e.g., 105/200/300/400) discussed herein. This signal has ISI. The plot 502 on the right is the eye diagram after ISI is cancelled using the switching equalizers discussed herein. The switching equalizer (e.g., 105/200/300/400) improves the eye height (y-axis) of the signal in plot 501 from 20 mV to 37 mV while eye width (x-axis) improves from less than 30 ps to greater than 90 ps thus allowing correct sensing of the signal by the following sense amplifier.

Figure 6:
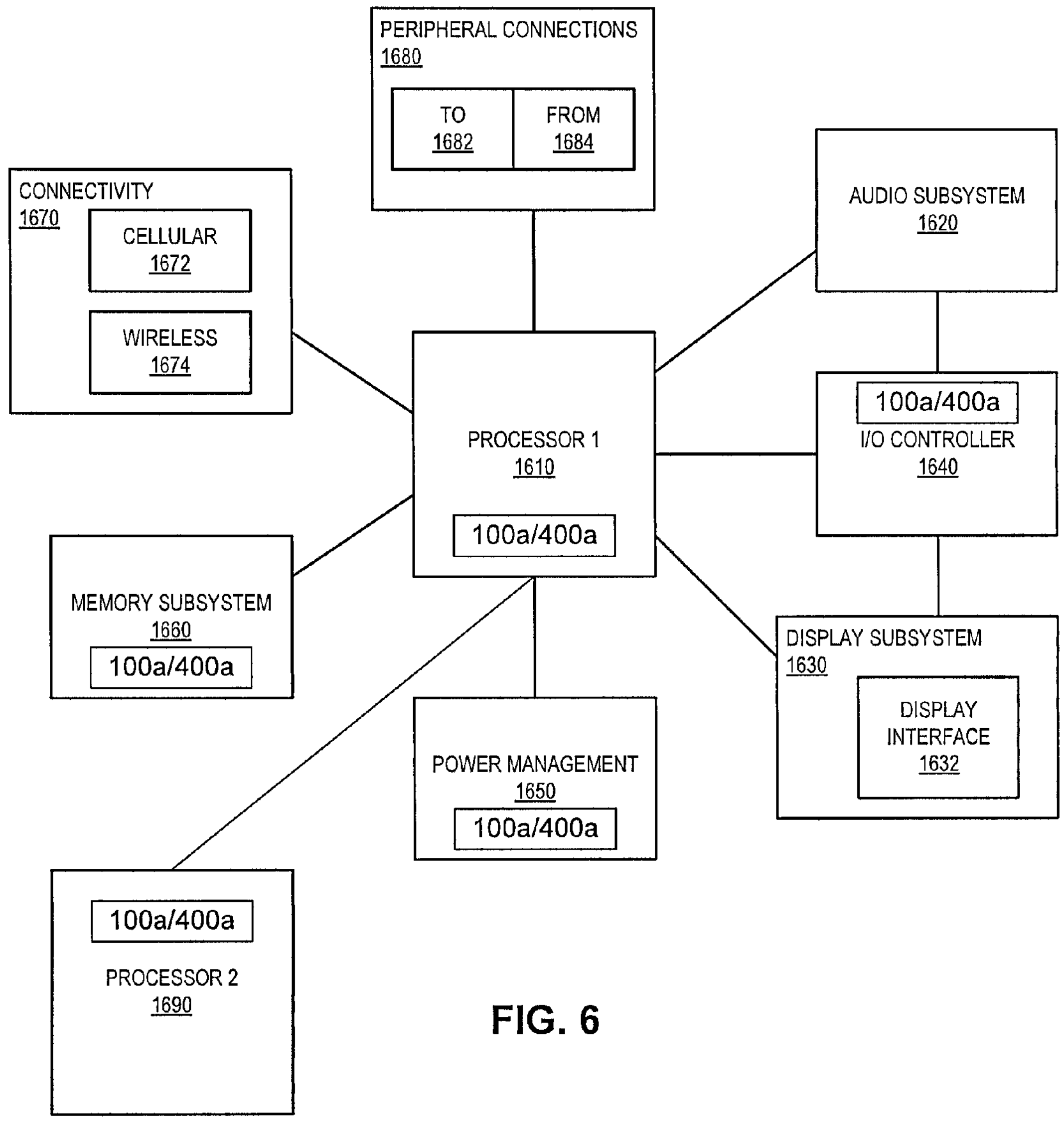
FIG. 6 is a system-level diagram of a smart device comprising a processor with a receiver operable to provide switching equalization, according to one embodiment of the disclosure.

FIG. 6 is a system-level diagram of a computing device 1600 (e.g., smart device) comprising a processor having the receiver 100*a*/400*a*, according to one embodiment of the disclosure. The receiver 100*a* may have any one of the switching equalizers discussed herein (e.g., 105/200/300/400). FIG. 6 also illustrates a block diagram of an embodiment of a mobile device in which flat surface interface connectors could be used. In one embodiment, the computing device 1600 represents a mobile computing device, such as a computing tablet, a mobile phone or smart-phone, a wireless-enabled e-reader, or other wireless mobile device. It will be understood that certain of the components are shown generally, and not all components of such a device are shown in device 1600.

In one embodiment, the computing device 1600 includes a first processor 1610 with the receiver 100*a*/400*a* and a second processor 1690 with a driver/transmitter 101/401. In other embodiments, one or more processors or chips in the computing device 1600 include the transceivers 100/400 with a receiver to provide switching equalizations according to the embodiments discussed herein.

The various embodiments of the present disclosure may also comprise a network interface within 1670 such as a wireless interface so that a system embodiment may be incorporated into a wireless device such as cell phone or personal digital assistant.

In one embodiment, the processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, the computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to device 1600 through which a user might interact with the system. For example, devices that can be attached to the computing device 1600 might include microphone devices, speaker or stereo systems, video systems or other display device, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of or in addition to display output. In another example, if display subsystem includes a touch screen, the display device also acts as an input device, which can be at least partially managed by I/O controller 1640. There can also be additional buttons or switches on the computing device 1600 to provide I/O functions managed by I/O controller 1640.

In one embodiment, the I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, the computing device 1600 includes power management 1650 that manages battery power usage, charging of the battery, and features related to power saving operation. Memory subsystem 1660 includes memory devices for storing information in device 1600. Memory can include nonvolatile (state does not change if power to the memory device is interrupted) and/or volatile (state is indeterminate if power to the memory device is interrupted) memory devices. Memory 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The device could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 1674 refers to wireless connectivity that is not cellular, and can include personal area networks (such as Bluetooth, Near Field, etc), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on device 1600. Additionally, a docking connector can allow device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the disclosure has been described in conjunction with specific embodiments thereof, many alternatives, modifications and variations of such embodiments will be apparent to those of ordinary skill in the art in light of the foregoing description.

For example, the embodiments herein describe NMOS based differential pairs in FIGS. 1-4. However, the architecture of the embodiments discussed herein can be implemented using p-type devices (e.g., pFET, PMOS, PNP BJT) without changing the essence of the embodiments of the disclosure. In such embodiments, the input transistors are p-type transistors, the tail current ($I_{tail}$) is coupled between the power supply and the source/drain of the p-type transistors, while the termination resistors are coupled between the ground and the drain/source of the p-type transistors.

The embodiments of the disclosure are intended to embrace all such alternatives, modifications, and variations as to fall within the broad scope of the appended claims. In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented i.e., such specifics should be well within purview of one skilled in the art. Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

In one example, the apparatus comprises: a sampler to sample an input signal; and an attenuator, coupled to the sampler, with a hysteresis associated with the input signal, the hysteresis of the attenuator is configurable to cancel hysteresis of a communication channel coupled to the attenuator.

In on embodiment, the apparatus further comprises one or more switches to periodically switch a role of the sampler with that of the attenuator. In one embodiment, each of the sampler and the attenuator comprises a differential pair amplifier. In one embodiment, the sampler and the attenuator comprise a single ended amplifier.

In one embodiment, the attenuator comprises: a capacitor coupled to a gate terminal of a transistor, the capacitor to store a previous value of the input signal; and a resistor, coupled to the capacitor, to adjust an attenuation rate of the attenuator. In one embodiment, the attenuator comprises: a switch, coupled to the capacitor, controllable via a periodic signal, wherein the capacitor is one of a parasitic capacitor or a discrete capacitor. In one embodiment, the sampler comprises: a capacitor coupled to a gate terminal of a transistor, the capacitor to store a current value of the input signal. In one embodiment, the sampler comprises: a switch, coupled to the capacitor, controllable via a periodic signal, wherein the capacitor is one of a parasitic capacitor or a discrete capacitor.

In one embodiment, the apparatus further comprises a serializer to convert a differential output from the attenuator and the sampler to a serial signal. In one embodiment, the apparatus further comprises: a polarity corrector to select a portion of the serial signal.

In another example, a system comprises: a first processor, to be coupled to a second processor via a communication channel, the first processor comprises: a receiver including the apparatus discussed herein including a sampler to sample an input signal to be received from the second processor; and an attenuator, coupled to the sampler, with a hysteresis associated with the input signal, the hysteresis of the attenuator is configurable to cancel hysteresis of the communication channel coupled to the attenuator. In one embodiment, the system further comprises a wireless interface for communicating with either the first or second processor.

In another example, the apparatus comprises: means for sampling an input signal; and means for providing a hysteresis associated with the input signal, the hysteresis is adjustable to cancel hysteresis of a communication channel. In one embodiment, the apparatus further comprises means for switching between the means for sampling and the means for providing.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. An apparatus comprising:

a sampler to sample an input signal;

an attenuator, coupled to the sampler, with a hysteresis associated with the input signal, the hysteresis of the attenuator is configurable to cancel hysteresis of a communication channel coupled to the attenuator; and one or more switches to periodically switch a role of the sampler with that of the attenuator.

2. The apparatus of claim 1 further comprises one or more switches to periodically switch a role of the sampler with that of the attenuator.

3. The apparatus of claim 1, wherein each of the sampler and the attenuator comprises a differential pair amplifier.

4. The apparatus of claim 1 further comprises:

a serializer to convert a differential output from the attenuator and the sampler to a serial signal.

5. The apparatus of claim 4 further comprises:

a polarity corrector to select a portion of the serial signal.

6. An apparatus comprising:

a sampler to sample an input signal; and an attenuator, coupled to the sampler, with a hysteresis associated with the input signal, the hysteresis of the attenuator is configurable to cancel hysteresis of a communication channel coupled to the attenuator, wherein the sampler comprises:

a capacitor coupled to a gate terminal of a transistor, the capacitor to store a current value of the input signal, wherein the attenuator comprises:

a resistor, coupled to the capacitor, to adjust an attenuation rate of the attenuator.

7. The apparatus of claim 6, wherein the attenuator comprises:

a switch, coupled to the capacitor, controllable via a periodic signal, wherein the capacitor is one of a parasitic capacitor or a discrete capacitor.

8. An apparatus comprising:

a sampler to sample an input signal; and an attenuator, coupled to the sampler, with a hysteresis associated with the input signal, the hysteresis of the attenuator is configurable to cancel hysteresis of a communication channel coupled to the attenuator, wherein the sampler comprises:

a capacitor coupled to a gate terminal of a transistor, the capacitor to store a current value of the input signal, wherein the sampler comprises a switch, coupled to the capacitor, controllable via a periodic signal, and further wherein the capacitor is one of a parasitic capacitor or a discrete capacitor.

9. A system comprising:

a first processor, to be coupled to a second processor via a communication channel, the first processor comprises:

a receiver including:

a sampler to sample an input signal to be received from the second processor;

an attenuator, coupled to the sampler, with a hysteresis associated with the input signal, the hysteresis of the attenuator is configurable to cancel hysteresis of the communication channel coupled to the attenuator; and one or more switches to switch a role of the sampler with that of the attenuator; and a wireless interface for communicating with either the first or second processor.

10. The system of claim 9, wherein the second processor comprises a transmitter to transmit the input signal to the receiver of the first processor via the communication channel.

11. The system of claim 9 further comprises a display unit.

12. A system comprising:

a first processor, to be coupled to a second processor via a communication channel, the first processor comprises:

a receiver including:

a sampler to sample an input signal to be received from the second processor; and an attenuator, coupled to the sampler, with a hysteresis associated with the input signal, the hysteresis of the attenuator is configurable to cancel hysteresis of the communication channel coupled to the attenuator; and a wireless interface for communicating with either the first or second processor, and wherein the sampler comprises:

a capacitor coupled to a gate terminal of a transistor, the capacitor to store a current value of the input signal, wherein the attenuator comprises:

a resistor, coupled to the capacitor, to adjust an attenuation rate of the attenuator.

13. The system of claim 12, wherein the attenuator comprises:

a switch, coupled to the capacitor, controllable via a periodic signal, wherein the capacitor is one of a parasitic capacitor or a discrete capacitor.

14. A system comprising:

a first processor, to be coupled to a second processor via a communication channel, the first processor comprises:

a receiver including:

a sampler to sample an input signal to be received from the second processor; and an attenuator, coupled to the sampler, with a hysteresis associated with the input signal, the hysteresis of the attenuator is configurable to cancel hysteresis of the communication channel coupled to the attenuator; and a wireless interface for communicating with either the first or second processor, and wherein the sampler comprises:

a capacitor coupled to a gate terminal of a transistor, the capacitor to store a current value of the input signal, wherein the sampler comprises a switch, coupled to the capacitor, controllable via a periodic signal, and wherein the capacitor is one of a parasitic capacitor or a discrete capacitor.

15. An apparatus comprising:

means for sampling an input signal; and means for providing a hysteresis associated with the input signal, the hysteresis is adjustable to cancel hysteresis of a communication channel.

16. The apparatus of claim 15 further comprises means for switching between the means for sampling and the means for providing.

* * * * *